US006003822A

United States Patent [19]

Kurosaki

[11] Patent Number: 6,003,822

[45] Date of Patent: Dec. 21, 1999

[54] HIGH-HAT STAND

[75] Inventor: Makoto Kurosaki, Hamamatsu, Japan

[73] Assignee: Yamaha Corporation, Shizuoka-ken, Japan

[21] Appl. No.: 09/096,361

[22] Filed: Jun. 12, 1998

[30] Foreign Application Priority Data

Jun. 20, 1997 [JP] Japan .................................... 9-164074

[51] Int. Cl.[6] ...................................................... F16M 11/00

[52] U.S. Cl. ........................ 248/161; 248/163.1; 84/422.3

[58] Field of Search ................................ 248/161, 163.1, 248/431, 170, 177.1; 84/422.1, 422.2, 422.3

[56] References Cited

U.S. PATENT DOCUMENTS

| | | | |
|---|---|---|---|
| 4,111,095 | 9/1978 | Simons | 84/422.3 |
| 4,520,710 | 6/1985 | Elliott, Jr. | 84/422.1 |
| 4,817,490 | 4/1989 | Cahill | 84/422.3 |
| 4,846,040 | 7/1989 | Hoshino | 84/422.3 |
| 4,905,565 | 3/1990 | Hoshino . | |
| 5,028,776 | 7/1991 | Forti et al. | 84/422.3 |
| 5,266,733 | 11/1993 | Jacobson | 84/422.3 |

FOREIGN PATENT DOCUMENTS 3-251895 11/1991 Japan .

*Primary Examiner*—Timothy V. Eley
*Assistant Examiner*—Willie Berry, Jr.
*Attorney, Agent, or Firm*—Hazel & Thomas, P.C.

[57] ABSTRACT

A high-hat stand comprising a rod engaging a reset spring from above, and having a movable cymbal installed on top, a pedal connecting to the bottom end of said rod, and vertically moving said rod by an urging operation, a roller link on the bottom end of said rod, and supported in the middle so as to be vertically freely moving, rotors supported in a freely rotatable manner on both ends of said roller link, and a communicating member running over these rotors, and one end of which is connected to said pedal and the other end of which is connected to pedal frame.

3 Claims, 4 Drawing Sheets

HIGH-HAT STAND

BACKGROUND OF THE INVENTION

1. Field of the Invention

The present invention relates to a high-hat stand, and in particular to a high-hat stand of superior performance and response characteristics.

This application is based on patent number Hei 9-164074 filed in Japan, the contents of which are incorporated herein by reference.

2. Description of Related Art

A high-hat stand is provided with a stand body, and a rod that extends through this stand body in a vertically freely moving manner, and engages with a reset spring in an upward direction. By pressing down a pedal positioned below the rod, the rod overcomes the tension of the reset spring, and can move down. Also, on the upper part of the stand body a stationary cymbal is installed, and on top of the rod a movable cymbal is installed. When performing, the performer steps down on the pedal, and the actuating rod is lowered, and the movable cymbal strikes the stationary cymbal.

The strength of the reset spring is very important in terms of improving the performance and response characteristics of the high-hat stand. That is, if the reset spring is too strong, the performer must push very hard on the pedal, making delicate operation of the pedal difficult. On the other hand, if the reset spring is too weak, the force of the performer's stepping on the pedal is light, and while delicate operation of the pedal is possible, the pedal return becomes slow, however, and quick pedal operation becomes difficult. Therefore, in order to improve the performance and response characteristics of the high-hat stand, it is necessary that the pedal can be stepped on lightly, but return quickly.

In order to resolve the above problem, a high-hat stand with a strong reset spring but a light pedal touch (Japanese Patent Application, First Publication, No. Hei 3-251895) is known. In this high-hat stand, as shown in FIG. 4, a wheel 3 used as a driving pulley is installed on the lower end of rod 1, and via the two chains wrapping around wheel 3, the rod 1 and the pedal 5 are connected The wheel 3 comprises two rotors 3A and 3B which rotate around a central shaft 2. The one end of chain 4A is connected to the large diameter rotor 3A, and the other end is attached to the pedal frame 6, while one end of the other chain 4B is connected to the small diameter rotor 3B, and the other end connected to the petal 5. In addition, reference numeral 7 is the reset spring of the rod 1, reference numeral 8A is the stationary cymbal, and reference numeral 8B is the moving cymbal.

In this high-hat stand, when the tensile force of the reset spring 7 is F, the urging force on the pedal 5 is P, the force required to move the rod 1 down is W (=F), and the operating distance for pedal 5 necessary to move the movable cymbal 8B down a certain distance (h) is H, the following relationship holds:

$$PH=Wh.$$

In addition, when the radius of the rotor 3B is X, and the radius of the rotor 3A is Y, the following relationships also hold:

$$H=h+X/Y\cdot h=(1+X/Y)h,$$

$$h=Y/(X+Y)H,$$

$$P=Y/(X+Y)W,$$

and $$W=(1+X/Y)P.$$

Therefore, when X:Y=1:2, $$P=\tfrac{2}{3}\,W,$$

and $$H=\tfrac{3}{2}\,h.$$

Additionally, when the end of the one chain 4B is connected to the rotor 3A, and the end of the other chain 4A is connected to the rotor 3B, and X:Y=2:1, then:

$$P=\tfrac{1}{3}\,W,$$

and $$H=3\,h.$$

Therefore, in a high-hat stand, when using a reset spring 7 having an identical tensile strength F, the urging force P of the pedal 5 is made smaller than the force W (=F) necessary to move the rod 1 down, and the operation distance H of pedal 5 required to move the movable cymbal 8B down a certain distance becomes large.

However, in this high-hat cymbal, because two rotors 3A and 3B which differ in size and two chains 4A and 4B which differ in length are necessary, the types of parts become numerous, and the assembly of the parts is troublesome. In addition, in order to obtain the large urging force P, the radius Y of the rotor 3A is made large, and the gap between the rotor 3A and the pedal frame 6 becomes narrow. Therefore, in fact, the operating distance H of the pedal S cannot be made large.

In consideration of the above-described problems, it is the object of the present invention to provide a high-hat stand which can make the urging force of the pedal small without changing the tensile force of the reset spring, and furthermore, has a small number of parts, and a large pedal operating distance.

SUMMARY OF THE INVENTION

The high-hat stand of the present invention has a rod engaging a reset spring in an upward direction and having a movable cymbal on top, a pedal which moves vertically by urging action, a roller link on the bottom end of the rod supported in the center in a vertically freely sliding manner, rotors respectively supported in a freely rotating manner on both ends of the roller link, and a communicating member running over these rotors, one end connected to the pedal and the other end connected to the pedal frame.

Additionally, the length of the communicating member can be adjusted by an length adjusting mechanism installed between one or the other end of the communicating member and the pedal or the pedal frame.

PREFERRED EMBODIMENT

Figure 1:
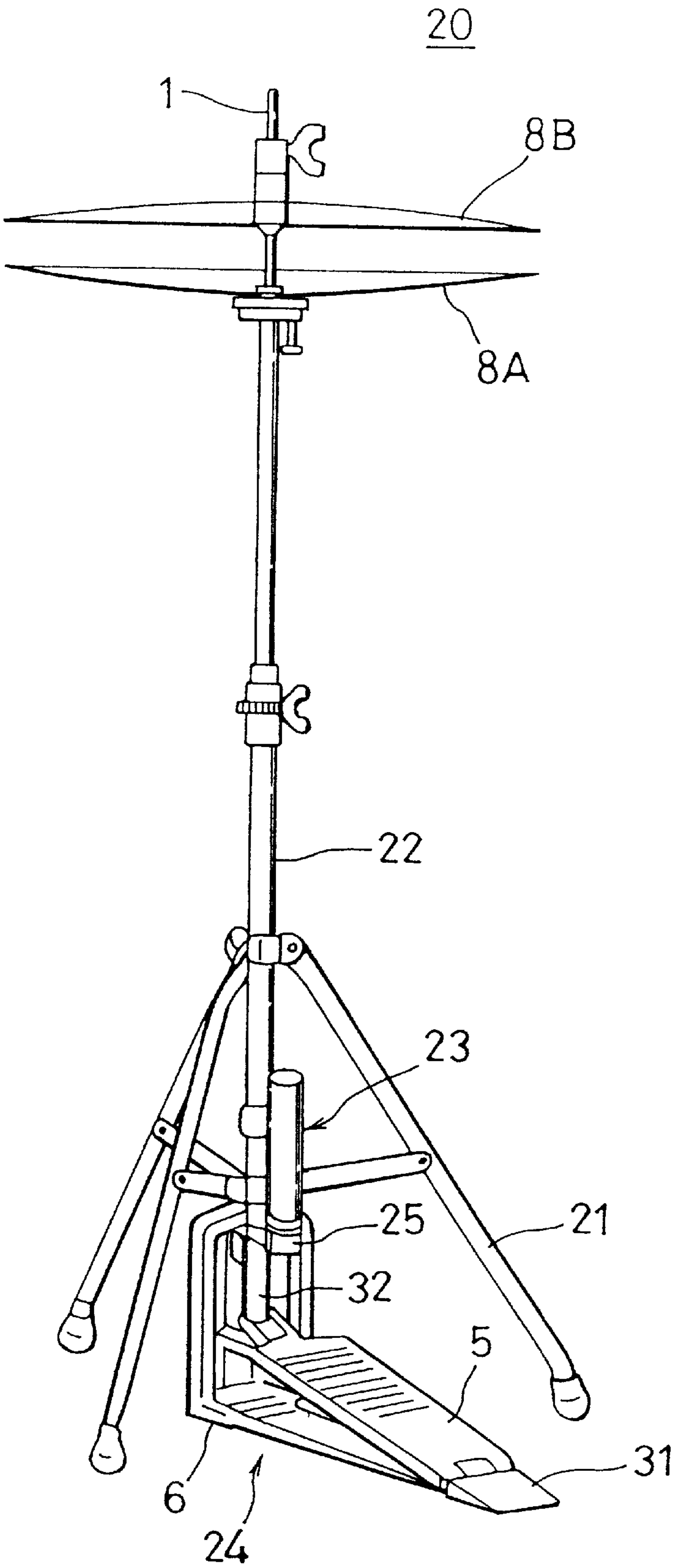
FIG. 1 is an diagonal view of the high-hat stand of the present invention.
Figure 2:
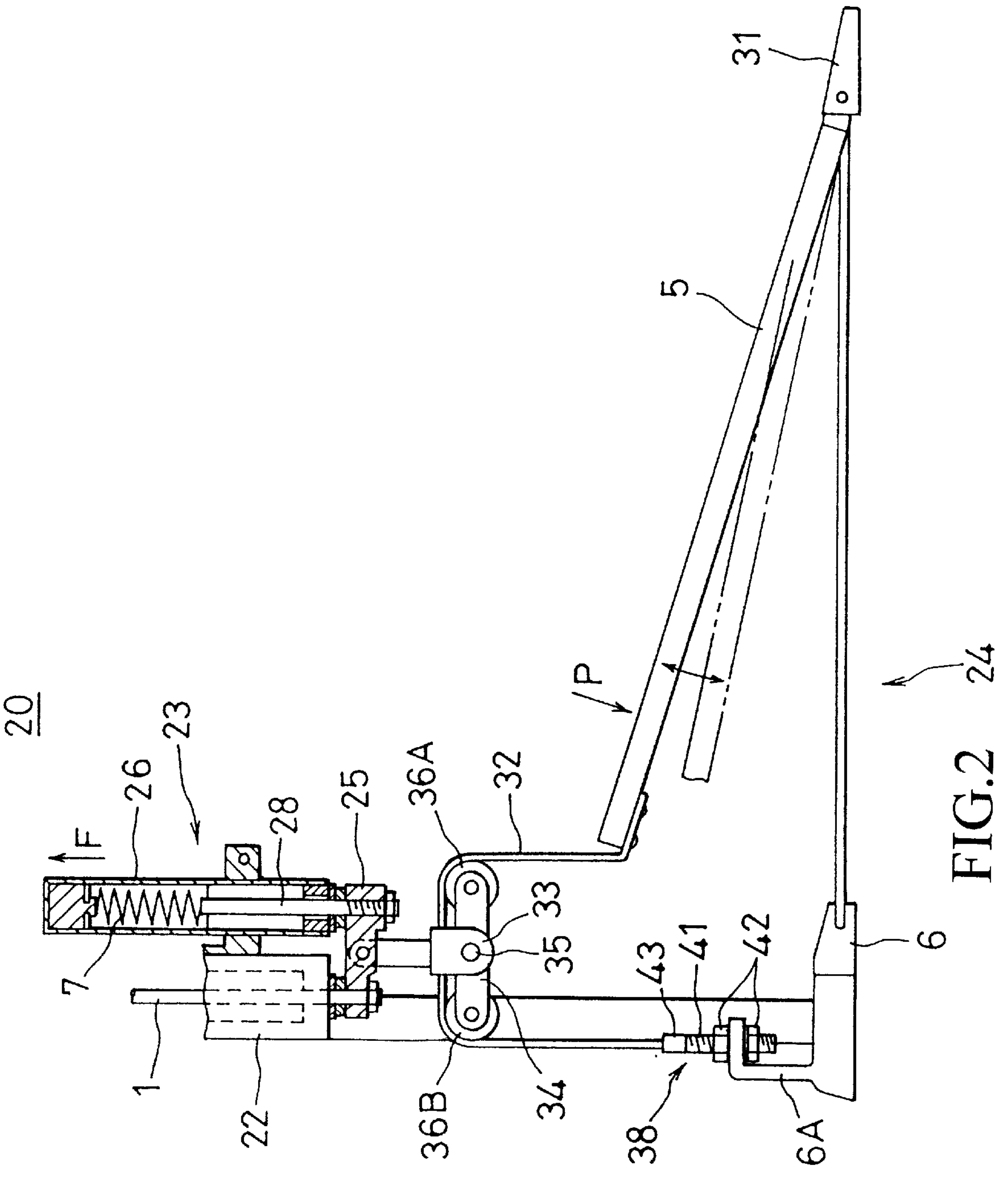
FIG. 2 is a cross-section of the major components of the high-hat stand of the present invention shown in FIG. 1.
Figure 3:
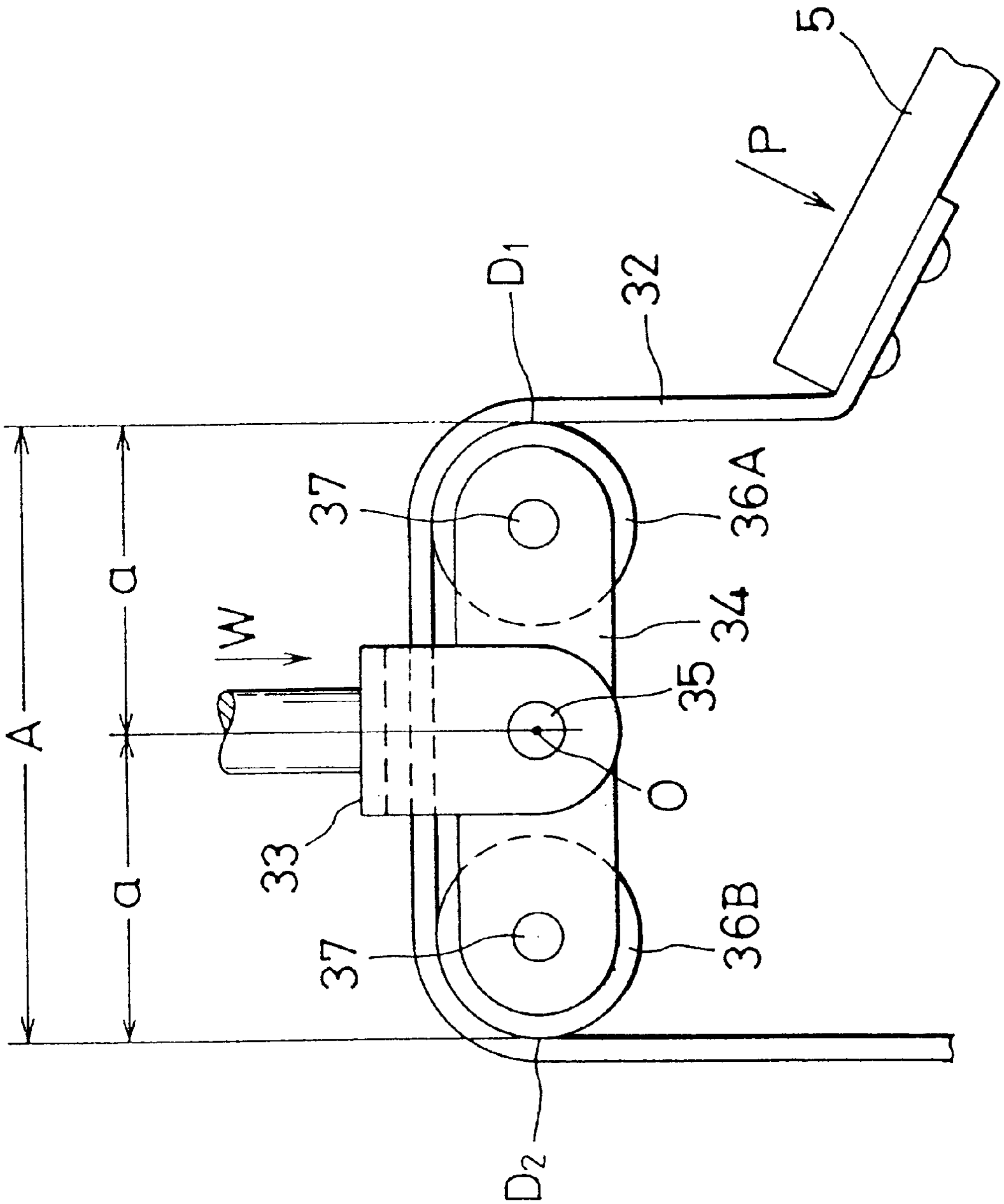
FIG. 3 is an diagonal view of the major component of the high-hat cymbal shown in FIG. 1.
Figure 4:
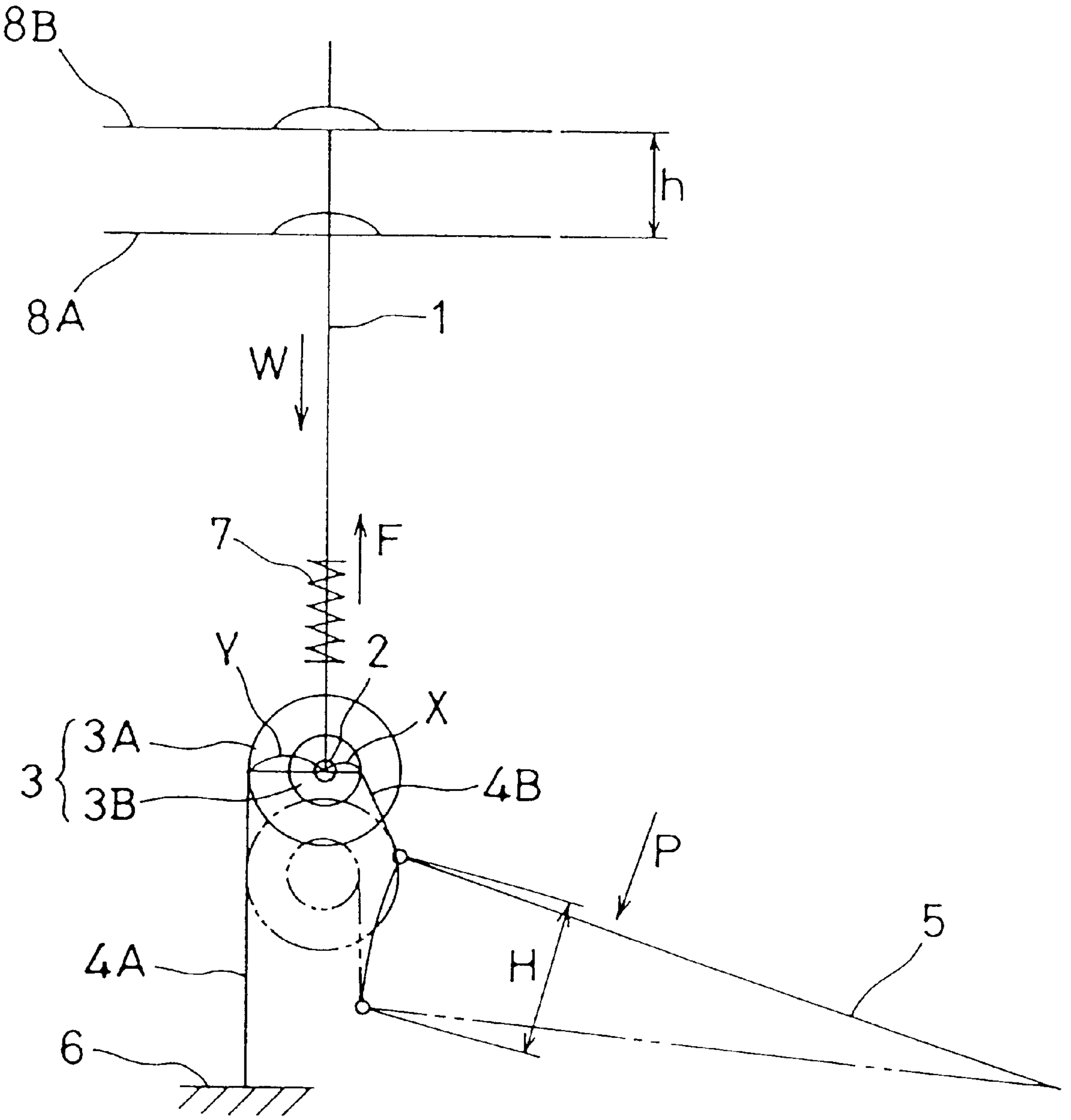
FIG.4 PRIOR ART
FIG. 4 shows an example of the structure of a conventional high-hat cymbal.

FIG. 1 is an diagonal view of the high-hat stand of the present invention, FIG. 2 is a cross-section of the major components of the high-hat stand of the present invention shown in FIG. 1, FIG. 3 is an diagonal view of the major component of the high-hat cymbal shown in FIG. 1, and FIG. 4 shows an example of the structure of a conventional high-hat cymbal. Moreover, the explanation of the parts having a structure identical to that shown in FIG. 4 have the same reference numerals as FIG. 4, and their explanation is omitted.

The high-hat cymbal 20 has a hollow stand body 22 which stands on a floor on a collapsible tripod 21, a rod 1 which runs through the stand body 22 in a vertically freely moving manner, a spring apparatus 23 engaging the rod in an upward direction, and a pedal apparatus positioned below the pedal apparatus 24. Additionally, on top of the stand body 22 a stationary cymbal 8A is installed, and on top of the rod 1 the movable cymbal 8B is installed.

The spring apparatus is provided with a pipe 26 fixed on the outer circumference of the stand body 22, a reset spring 7 whose upper end is connected to the pipe 26, and a spring rod 28 inserted from the lower direction in the pipe 26. On the upper end of the spring rod 28, the reset spring 7 is connected, and the bottom end of the spring rod 28 is connected to the coupling member 25. The coupling member 25 is connected to the lower end of the rod 1.

The pedal mechanism 24 is provided with a pedal frame 6 which is set up on the floor, a pedal 5 connected so that its toe end is vertically freely moving, and a communicating member (belt) 32 connecting the toe end of the pedal 5 with the lower end of the rod 1.

On the coupling member 25, the roller link 34 is installed via the bearing 33. The roller link 34 extends roughly in the same direction as the pedal, and is attached in a vertically freely sliding manner to the shaft 35 on which the bearing is installed. Additionally, on both ends of the roller link 34, two rotors 36A and 36B of equal diameter are each attached in a freely rotatable manner by pins 37, and the distance from the sliding center 0 of roller link 34 to the rotors 36A and 36B is identical.

Furthermore, the middle section of a communicating member 32, one end of which is attached to the toe end of pedal 5, runs over the rotors 36A and 36B. The other end of the communicating member 32 is connected to the coupler 6A formed on the pedal frame via the length adjustment mechanism 38.

The length adjustment mechanism 38 is provided with a screw 41 engaging a screw hole formed on the coupler 6A, two nuts 42 connecting the screw 41 and the coupler 6A, and a rotator 43. In addition, the other end of the communicating member 32 is connected to this rotator 43.

In the case of the high-hat stand 20, as shown in FIG. 2, the toe end of the pedal 5 is usually maintained in a position above the floor. While performing, when pedal 5 is stepped on, because the coupling member 25 overcomes the reset spring 7 and moves down, the interlocking rod 1 also moves down, and the movable cymbal 8B strikes the stationary cymbal 8A. Additionally, to change the inclination angle of the pedal 5, the nut 42 is loosened, the screw 41 is moved vertically, and the length of the communication member changes.

Furthermore, in this high-hat stand 20, when the distance form the sliding center O of the roller link 34 to the contact points $D_1$ and $D_2$ between both ends of the rotors 36A and 36B and the communicating body 32 is a, and the distance between the contact points $D_1$ and $D_2$ is A, when the pedal is urged, the communicating member 32 is pulled down, and the roller link 34 moves downward with the contact point $D_2$ as a fulcrum. At this time, when the urging force of the pedal 5 is P, and the downward force of the rod 1 is W (=F), according to the principle of the lever, the following relationship holds:

$$A \cdot P = a \cdot W.$$

Here, because A=2 *a*, $$A \cdot P = 2a \cdot P = a \cdot W,$$

and as a result, $$P = \tfrac{1}{2} W.$$

Again, when the distance from the sliding center O to the contact point $D_1$ is changed, and the distance from the sliding point O to the contact point $D_2$ is a, then $$A \cdot P = 3A \cdot P = a \cdot W,$$

and $$P = \tfrac{1}{3} W.$$

Therefore, in this high-hat stand 20, when using a reset spring 7 having an identical tensile force F; the urging force P of the pedal 5 becomes smaller then the force W necessary to lower the rod 1. As a result, in this high-hat stand 20, like the conventional high-hat stand shown in FIG. 4, the performance and response characteristics of the high-hat stand 20 are improved. In addition, this means that when the urging force P of the pedal 5 is made constant, it is possible to use a reset spring 7 of higher tensile force and improved response characteristics.

Furthermore, in the high-hat stand 20 of the present invention, because the principle of the lever is used, the difference in size of the rotors 36A and 36B is irrelevant to the urging force P of the pedal 5. Therefore, rotors 36A and 36B which are identical can be used, and only one communicating member is necessary. The result is that compared to the conventional high-hat stand-shown in FIG. 4, because the number of parts decreases, the manufacturing cost can be lowered, and it is easy to control the parts.

In addition, in the high-hat stand 20 of the present invention, the space between the rotors 36A and 36B and the pedal frame 6 becomes relatively large when compared to the conventional high-hat stand shown in FIG. 4. As a result, the operational distance of the pedal used to lower the movable cymbal 8B a certain distance becomes large.

Moreover, in the above-described embodiment, a belt can be substituted for the communicating member 32, a roller can be substituted for rotors 36A and 36B, a chain belt, timing belt, or wire can be substituted for the communicating member 32, and a sprocket or gear can be substituted for the rotors 36A and 36B, since the cost of these parts is lower.

What is claimed is:

1. A high-hat stand comprising:

a rod engaging a reset spring from above, and having a movable cymbal installed on top, a pedal connecting to the bottom end of said rod, and vertically moving said rod by an urging operation, a roller link on the bottom end of said rod, and supported in the middle so as to be vertically freely moving, rotors supported in a freely rotatable manner on both ends of said roller link, and a communicating member running over these rotors, and one end of which is connected to said pedal and the other end of which is connected to pedal frame.

2. A high-hat stand according to claim 1 wherein the length of said communicating member is adjustable by a length adjusting installed built between one end of the communicating member and said pedal.

3. A high-hat stand according to claim 1 wherein the length of said communicating member can be adjusted by a length adjustment mechanism installed between one end of the communicating member and said pedal frame.

* * * * *